US008341716B2

United States Patent
Sakayama et al.

(10) Patent No.: US 8,341,716 B2
(45) Date of Patent: Dec. 25, 2012

(54) INFORMATION PROCESSING DEVICE, INFORMATION PROCESSING METHOD, AND STORAGE MEDIA STORING USER CERTIFICATION PROGRAM

(75) Inventors: Takashi Sakayama, Kanagawa (JP); Shinji Akahira, Kanagawa (JP); Daigo Yamagishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 918 days.

(21) Appl. No.: 12/138,618

(22) Filed: Jun. 13, 2008

(65) Prior Publication Data
US 2009/0119765 A1 May 7, 2009

(30) Foreign Application Priority Data

Nov. 7, 2007 (JP) ................................. 2007-289591
Nov. 7, 2007 (JP) ................................. 2007-289592
Nov. 7, 2007 (JP) ................................. 2007-289593

(51) Int. Cl.
*H04L 9/32* (2006.01)

(52) U.S. Cl. ......... 726/10; 726/4; 726/5; 726/6; 726/18; 726/19; 726/26; 713/155; 713/156; 713/175

(58) Field of Classification Search .................. 726/10, 726/18–19, 26, 4–6; 713/155–156, 175
See application file for complete search history.

(56) References Cited

U.S. PATENT DOCUMENTS

| | | | | |
|---|---|---|---|---|
| 6,055,236 A | * | 4/2000 | Nessett et al. | 370/389 |
| 6,658,568 B1 | * | 12/2003 | Ginter et al. | 713/193 |
| 6,842,449 B2 | * | 1/2005 | Hardjono | 370/352 |
| 6,987,847 B1 | * | 1/2006 | Murphy et al. | 379/201.1 |
| 7,073,073 B1 | * | 7/2006 | Nonaka et al. | 713/193 |
| 7,133,846 B1 | * | 11/2006 | Ginter et al. | 705/54 |
| 7,165,175 B1 | * | 1/2007 | Kollmyer et al. | 713/154 |
| 2003/0154413 A1 | * | 8/2003 | Shigeeda | 713/202 |
| 2004/0156068 A1 | | 8/2004 | Yoshida et al. | |

(Continued)

FOREIGN PATENT DOCUMENTS

JP 2-246561 A 10/1990

(Continued)

OTHER PUBLICATIONS

Japanese Office Action dated Dec. 22, 2009 for JP Application No. 2007-289591.

(Continued)

*Primary Examiner* — Kambiz Zand
*Assistant Examiner* — Tongoc Tran
(74) *Attorney, Agent, or Firm* — Sughrue Mion, PLLC

(57) ABSTRACT

The information processing device includes, a communication portion that communicates with a certification device which performs certification of whether or not a user has usage permission, a reception portion that receives input identification information for identifying the user, a storage portion that stores previously registered identification information, a certification portion that performs user certification, when the reception portion receives the input identification information and the communication portion requests certification of a user by sending the identification information to the certification device, based on result information, when result information is obtained from the certification device indicating a certification result, and based on whether or not the identification information is stored in the storage portion, when the result information is not obtained, and a registration portion that registers the certified identification information in the storage portion, when certification that a user has usage permission is obtained based on the result information.

9 Claims, 11 Drawing Sheets

U.S. PATENT DOCUMENTS

| | | |
|---|---|---|
| 2004/0184054 A1 | 9/2004 | Takahira et al. |
| 2005/0044248 A1 | 2/2005 | Mihira et al. |
| 2005/0207578 A1* | 9/2005 | Matsuyama et al. .......... 380/231 |
| 2006/0046691 A1* | 3/2006 | Nishio .......................... 455/410 |
| 2006/0064753 A1 | 3/2006 | Otake et al. |
| 2007/0162949 A1* | 7/2007 | Nitta et al. ................... 725/134 |
| 2012/0011585 A1 | 1/2012 | Otake et al. |

FOREIGN PATENT DOCUMENTS

| | | | |
|---|---|---|---|
| JP | 2000-235548 A | 8/2000 | |
| JP | 2001-167051 A | 6/2001 | |
| JP | 2003308405 A | 10/2003 | |
| JP | 2004-098505 A | 4/2004 | |
| JP | 2004-246419 A | 9/2004 | |
| JP | 2004-287612 A | 10/2004 | |
| JP | 2004-287655 A | 10/2004 | |
| JP | 2005-038435 A | 2/2005 | |
| JP | 2005-056393 A | 3/2005 | |
| JP | 2005149256 A | 6/2005 | |
| JP | 2005-190348 A | 7/2005 | |
| JP | 2005-311527 A | 11/2005 | |
| JP | 2006-041688 A | 2/2006 | |
| JP | 2006050137 A | 2/2006 | |
| JP | 2006092018 A | 4/2006 | |
| JP | 2006-212288 A | 8/2006 | |
| JP | 2006215682 A | 8/2006 | |
| JP | 2006-251996 A | 9/2006 | |
| JP | 2007-049318 A | 2/2007 | |
| JP | 2007-067849 A | 3/2007 | |
| JP | 2007102774 A | 4/2007 | |
| JP | 2007-251565 A | 9/2007 | |
| JP | 2007-306331 A | 11/2007 | |
| WO | 2006/082853 A1 | 8/2006 | |
| WO | 2007/132764 A1 | 11/2007 | |

OTHER PUBLICATIONS

Japanese Office Action dated Dec. 22, 2009 for JP Application No. 2007-289592.

Japanese Office Action dated Mar. 16, 2010 for Japanese Patent Application No. 2007-289592 and English-language translation.

Notice of Reason for Rejection issued in corresponding Japanese Application No. 2010-219864, dated Feb. 7, 2012.

* cited by examiner

INFORMATION PROCESSING DEVICE, INFORMATION PROCESSING METHOD, AND STORAGE MEDIA STORING USER CERTIFICATION PROGRAM

CROSS-REFERENCE TO RELATED APPLICATION

This application is based on and claims priority under 35 USC 119 from Japanese Patent Applications No. 2007-289591, No. 2007-289592, No. 2007-289593 all filed Nov. 7, 2007.

BACKGROUND

1. Technical Field

The present invention relates to an information processing device, an information processing method, and a recording media storing a user certification program.

2. Related Art

Conventionally, as a technique carrying out a certification of a user in an information processing device, a technique which registers a user ID or a password of a user that a manager allows the use in the information processing device so as to previously store as a user management information, and carries out a certification of the user by collating a user ID or a password input at a time of log-in to the user management information.

However, when the users respectively use plural information processing devices, it is necessary for the manager to individually manage the user management information of each of the information processing devices, a complication is generated.

Accordingly, a technique which connects an information processing device and a certification device storing a user management information via a network and transmits a user ID or a password at a time of log-in to the certification device so as to carry out a certification of the user.

Further, a technique which registers a user ID and a password of a user that a manager allows the user of an information device and a certification device so as to previously store as a user management information, in a structure in which the information processing device and the certification device are connected via a network, and carries out a certification of the user by collating to the user management information stored in the information processing device when the network is incommunicable.

SUMMARY

According to an aspect of the invention, there is provided an information processing device including, a communication portion that communicates with a certification device which performs certification of whether or not a user has usage permission, a reception portion that receives input identification information for identifying the user, a storage portion that stores previously registered identification information, a certification portion that performs user certification, when the reception portion receives the input identification information and the communication portion requests certification of a user by sending the identification information to the certification device, based on result information, when result information is obtained from the certification device indicating a certification result, and based on whether or not the identification information is stored in the storage portion, when the result information is not obtained, and a registration portion that registers the certified identification information in the storage portion, when certification that a user has usage permission is obtained based on the result information.

BRIEF DESCRIPTION OF THE DRAWINGS

Exemplary embodiments of the present invention will be described in detail based on the following figures wherein.

DETAILED DESCRIPTION

A description will be in detail given below of exemplary embodiments in accordance with the present invention with reference to the accompanying drawings. In this case, a description will be given below of the invention on the basis of a user certification system to which a complex machine serving as an information processing device and a certification device are connected, and which carries out a certification of a user using the complex machine in the certification device.

-First Exemplary Embodiment-

Figure 1:
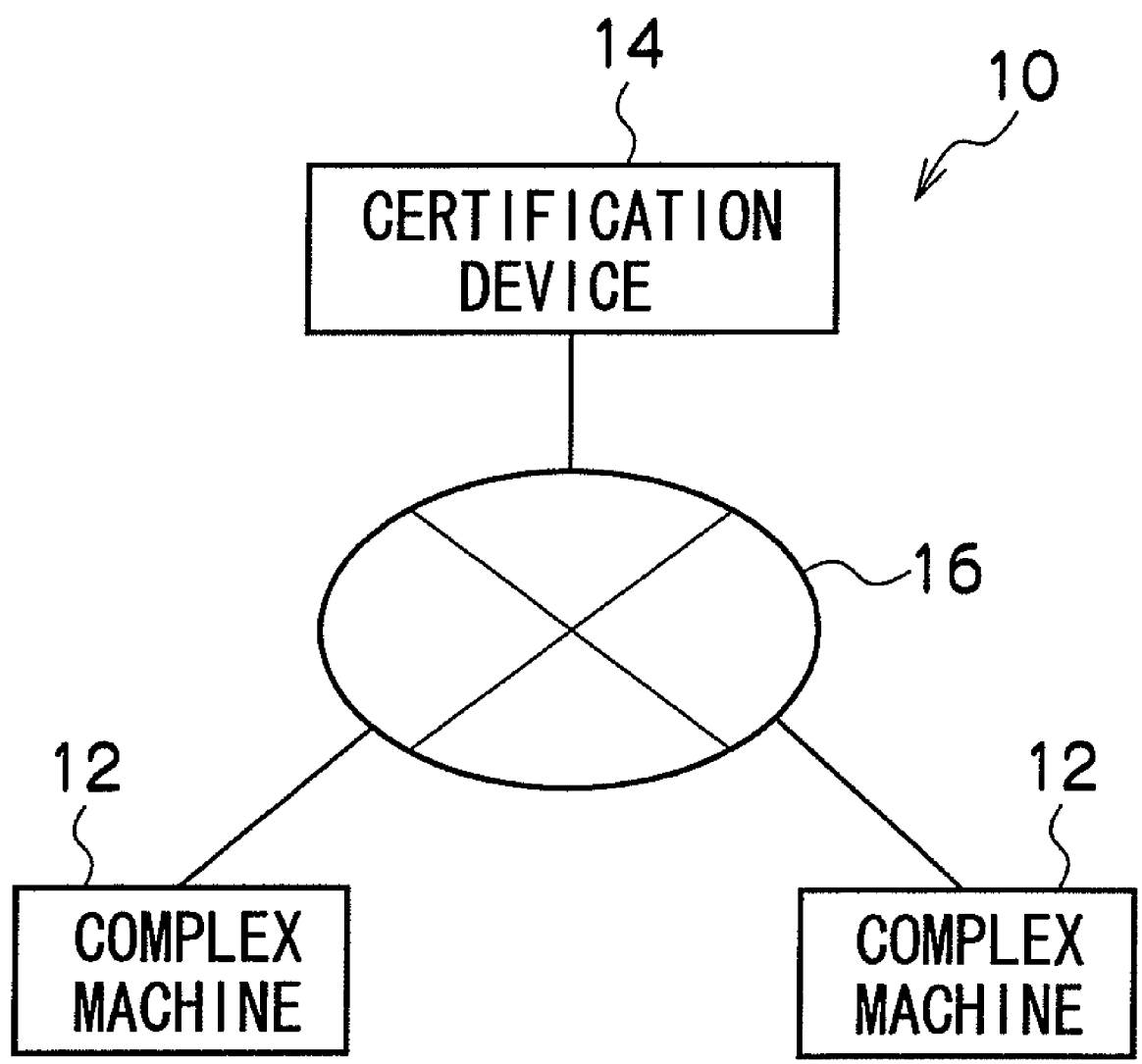
FIG. 1 is a block diagram showing a general outline structure of a document certification system in accordance with an exemplary embodiment.

FIG. 1 shows a general outline structure of a user certification system 10 in accordance with the present exemplary embodiment.

As shown in the drawing, the user certification system 10 is provided with a complex machine 12 (or complex machines 12) and a certification device 14, and the complex machine 12 and the certification device 14 are connected by a network 16.

Figure 2:
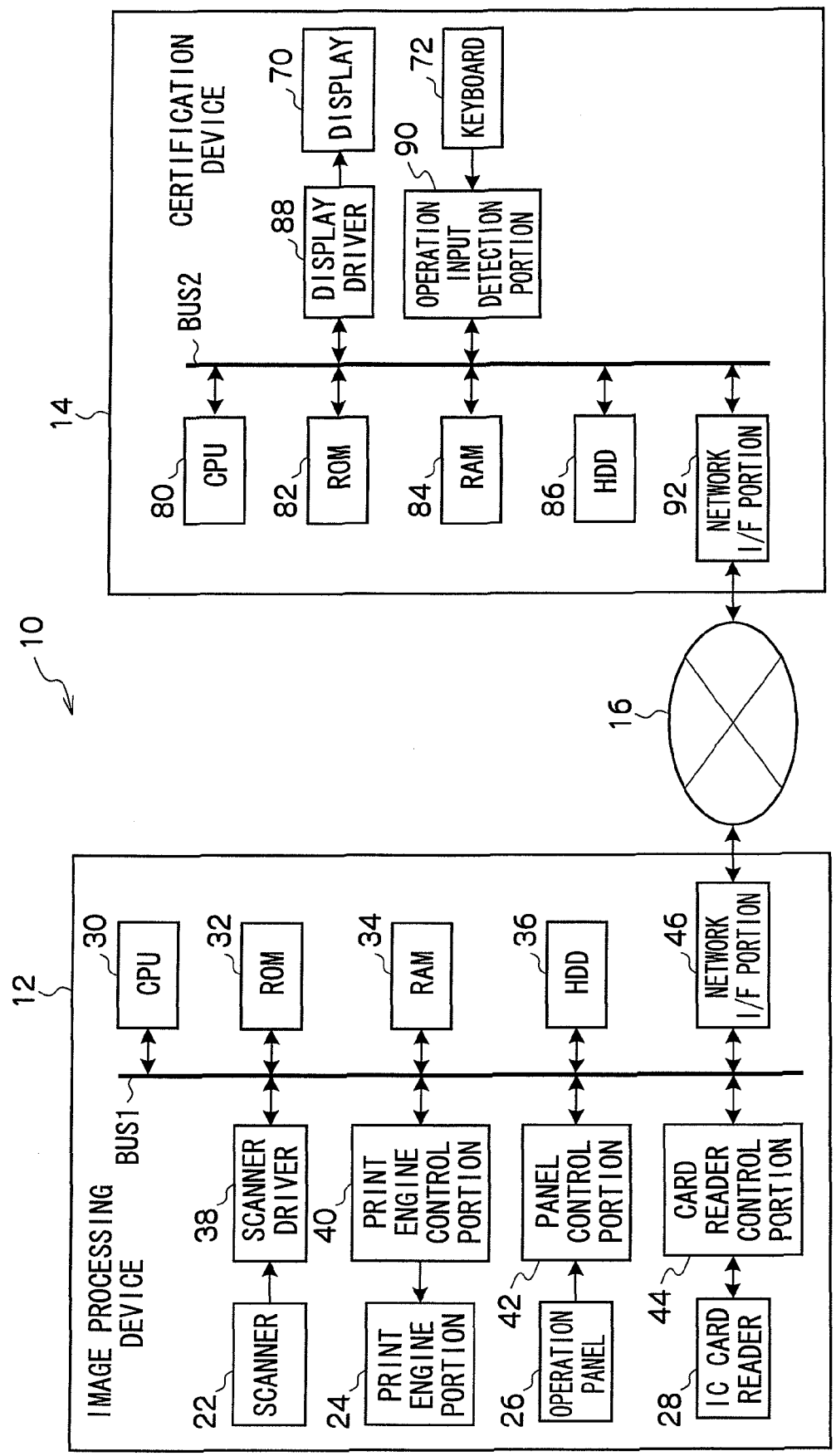
FIG. 2 is a block diagram showing a structure of a complex machine and a server in accordance with the exemplary embodiment.

FIG. 2 shows a structure of the complex machine 12 and the certification device 14 in accordance with the present exemplary embodiment.

As shown in the drawing, the complex machine 12 is provided with a scanner 22 reading an image from a recording paper set at a predetermined reading position, and acquiring an image data indicating the image, a print engine portion 24 printing the image on the recording paper in accordance with an electrophotographic method, an operation panel 26 having an operation button and a 10-key keyboard to which various operation commands such as a copy operation and the like are input, and a display portion for displaying various messages or the like, and an IC card reader 28 for reading an information stored in an integrated circuit (IC) card.

In this case, the print engine portion 24 in accordance with the present exemplary embodiment may form a full color image by using four color toners including yellow, magenta, cyan and black colors. Further, a monochrome shading image may be formed by using only the black toner.

Further, the complex machine 12 is provided with a central processing unit (CPU) 30 executing a motion of a whole device, an ROM 32 in which various programs including a control program and a user certification program mentioned below are previously stores, an RAM 34 temporarily storing various data, a hard disc drive (HDD) 36 storing the various data so as to hold, a scanner driver 38 controlling an optical image reading by the scanner 22, a print engine control portion 40 controlling an actuation of the print engine portion 24, a panel control portion 42 detecting an operation status with respect to the operation panel 26, a card reader control portion 44 controlling the reading of the IC card by the IC card reader 28, and a network interface (I/F) portion 46 connected to the network 16 and sending and receiving a communication data with respect to the network 16.

The CPU 30, the ROM 32, the RAM 34, the HDD 36, the scanner driver 38, the print engine control portion 40, the panel control portion 42, the card reader control portion 44, and the network I/F portion 46 are connected to each other via a system bus BUS 1. Accordingly, the CPU 30 may have access to the ROM 32, the RAM 34 and the HDD 36, and carries out a control of an actuation of the scanner 22 via the scanner driver 38, a control of an actuation of the print engine portion 24 via the print engine control portion 40, a control of the reading of the IC card by the IC card reader 28 via the card reader control portion 44, and a control of the send and receive of the data with respect to the other terminal device connected to the network 16 via the network I/F 46. Further, the CPU 30 may comprehend an operation status of the user with respect to the operation button or the 10-key keyboard provided in the operation panel 26 via the panel control portion 42. Further, the CPU 30 may control a display of a message on a display portion provided in the operation panel 26 via the panel control portion 42.

On the other hand, the certification device 14 is structured as a server computer, and is provided with a display 70 displaying an operation menu, a message or the like, and a keyboard 72 to which various operation commands from the user are input.

Further, the certification device 14 in accordance with the present exemplary embodiment is provided with a CPU 80 executing a motion of the whole device, an ROM 82 in which various programs including a control program and the like are previously stored, an RAM 84 temporarily storing the various data, an HDD 86 storing the various data so as to hold, a display driver 88 controlling the display of the various information on the display 70, an operation input detection portion 90 detecting an operation status with respect to the keyboard 72, and a network I/F portion 92 connected to the network 16 and sending and receiving the communication data with respect to the network 16.

The CPU 80, the ROM 82, the RAM 84, the HDD 86, the display driver 88, the operation input detection portion 90 and the network I/F portion 92 are connected to each other via a system bus BUS2. Accordingly, the CPU 80 may have access to the ROM 82, the RAM 84 and the HDD 86, and may carry out the control of the display of the various information on the display 70 via the display driver 88, and the control of the send and receive of the data with respect to the other terminal device connected to the network 16 via the network I/F 92. Further, the CPU 80 may comprehend the operation status of the user with respect to the keyboard 72 via the operation input detection portion 90.

Next, a description will be given of a certification of the user by the user certification system 10 in accordance with the present exemplary embodiment.

The certification device 14 in accordance with the present exemplary embodiment is structured such that a user ID is previously registered as an identification information for identifying the user to be allowed to use each of the complex machines 12 by a manager, and stores the ID information indicating the registered user ID in the HDD 86.

On the other hand, the complex machine 12 in accordance with the present exemplary embodiment carries out the user certification by using the user ID, and when an allowable user is identified by carrying out the user certification, various operations such as a scan operation of a copy by the scanner 22, a copy operation and the like may be carried out.

Further, the complex machine 12 stores the ID information of the user previously certified by the certification device 14 in the HDD 36.

When the user uses the complex machine 12, the user inputs the user ID by operating the 10-key keyboard provided in the operation panel 26, or making the IC card storing the ID information be read by the IC card reader 28.

When the input of the user ID is received by operating the 10-key keyboard provided in the operation panel 26 or reading the IC card by the IC card reader 28, the complex machine 12 sends the ID information indicating the user ID to the certification device 14 by the network I/F portion 46 so as to ask for the certification of the user.

The certification device 14 carries out the certification of the user by collating whether or not the ID information sent from the complex machine 12 is stored in the HDD 36, and sends a result information indicating a result of certification to the complex machine 12.

When the result information is obtained from the certification device 14, the complex machine 12 carries out the certification of the user in accordance with the result information.

Further, when the certification indicating the user to be allowed to use is obtained on the basis of the result information, the complex machine 12 registers the ID information of the certified user in the HDD 36.

Further, when the result information may not be obtained from the certification device 14, for example, because a communication failure is generated in the network 16 and the complex machine 12 may not communicate with the certification device 14, the complex machine 12 carries out the certification of the user by collating whether or not the ID information indicating the received user ID is stored in the HDD 36.

Further, when the certification is obtained by the certification device 14 or the certification is obtained by collating whether or not the user ID is stored, the complex machine 12 allows to be used.

Next, a description will be given of a flow of a detailed process of the complex machine 12 at a time of carrying out the certification of the user.

Figure 3:
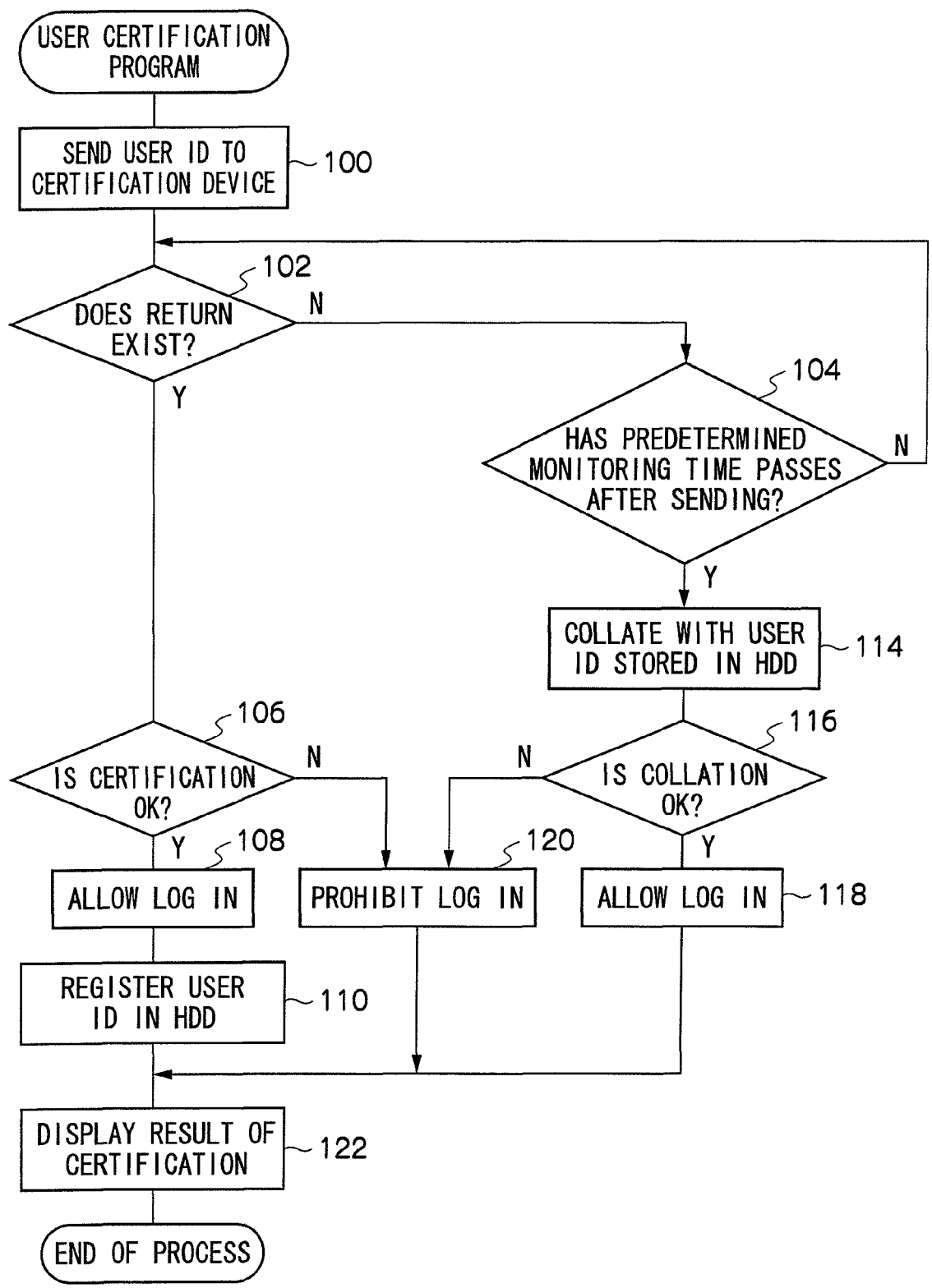
FIG. 3 is a flow chart showing a flow of a process of a user certification program in accordance with a first exemplary embodiment.

FIG. 3 shows a flow chart showing a flow of a process of the user certification program executed by the CPU 30 when the input of the user ID is received by the operation panel 26. In this case, the program is previously stored in a predetermined region of the ROM 32.

A step 100 in FIG. 3 asks for the certification of the user by sending the ID information indicating the user ID received by the operation panel 26 to the certification device 14 from the network I/F portion 46 via the network 16.

The next step 102 determines whether or not the result information is received by the certification device 14, the step gives way to a step 106 when the result information is received, and the step gives way to a step 104 when the result information is not received.

The step 104 determines whether or not a predetermined monitor time (for example, 30 seconds) has passed after sending the ID information in the step 100, the step gives way to a step 114 when an affirmative determination is obtained, and the step gives way to the step 102 when a negative determination is obtained so as to keep up waiting for receiving the result information.

The step 106 determines whether or not the certification of the user to be allowed to use is obtained in the received result information, and the step gives way to a step 108 when an affirmative determination is obtained, and the step gives way to a step 120 when a negative determination is obtained.

The step 108 allows to log on the present device so as to make the operation panel 26 effective, and receives the various operations with respect to the operation panel 26.

Accordingly, the use of the complex machine 12 is allowed with respect to the user that the certification of the user to be allowed to use is obtained by the certification device 14.

Further, the step 110 registers the ID information of the user that the certification is obtained in the step 106 in the HDD 36 so as to store.

Accordingly, the ID information of the user that the certification of the user to be allowed to use is obtained by the certification device 14 is stored in the HDD 36 of the complex machine 12.

On the other hand, the step 114 carries out the certification whether or not the user to be allowed to use, by collating whether or not the ID information of the user received by the operation panel 26 is stored in the HDD 36.

The next step 116 determines whether or not the ID information is collated, the step gives way to a step 118 when the ID information is collated, and the step gives way to a step 120 when the ID information may be not collated.

The step 118 allows to log in the present device so as to make the operation panel 26 effective, and receives the various operations with respect to the operation panel 26.

Accordingly, for example, even when the communication failure is generated in the network 16 and the communication with the certification device 14 may not be carried out, so that the result information may not be obtained from the certification device 14, the certification of the user may be carried out, and the complex machine 12 is allowed to be used with respect to the user that the certification of the user to be allowed to use is obtained.

On the other hand, the step 120 inhibits the log-in of the present device so as to invalidate the operation panel 26, and does not receive the various operations with respect to the operation panel 26.

Accordingly, the complex machine 12 becomes in a state in which the complex machine 12 may not be used with respect to the user that the certification of the user to be allowed to use is not obtained.

Further, a step 122 displays the result of certification on the display portion provided in the operation panel 26, and present user certification program is finished.

As mentioned above, in accordance with the present exemplary embodiment, a labor hour for registering the user to be allowed to use by the manager is lightened by registering the ID information of the user that the certification is obtained, when the certification of the user to be allowed to use may be obtained by the certification device 14. Further, since the certification of the user may be carried out by determining whether or not the ID information is the previously registered ID information, when the result information by the certification device 14 is not obtained, the certification of the user is carried out even when the network is incommunicable.

-Second Exemplary Embodiment-

Since the structure of the user certification system 10 in accordance with a second exemplary embodiment, and the structures of the complex machine 12 and the certification device 14 are the same as the first exemplary embodiment (refer to FIGS. 1 and 2), a description thereof will be omitted here.

Next, a description will be given of the certification of the user by the user certification system 10 in accordance with the present exemplary embodiment.

The certification device 14 in accordance with the present exemplary embodiment is structured such that the user ID of the user to be allowed to use each of the complex machines 12 and the password are previously registered by the manager, and stores the ID information indicating the registered user ID and the password information indicating the password in an associated manner in the HDD 86.

Further, the certification device 14 is structured such that whether or not the ID information of the user and the password information are allowed to be registered in the HDD 36 of the complex machine 12 is registered per user by the manager, and stores the identification registration authorization information indicating whether or not the registration is allowed in the HDD 86 so as to be associated with the ID information of the user.

The certification device 14 returns the identification registration authorization information associated with the ID information of the user together with the result information to the certification request of the user.

On the other hand, the complex machine 12 in accordance with the present exemplary embodiment carries out the user certification by using the user ID and the password, and when the allowable user is identified by carrying out the user certification, the various operations such as the scan operation of the copy by the scanner 22, the copy operation and the like may be carried out.

Further, the complex machine 12 stores the ID information of the user and the password information which may be previously identified as the allowable user by the certification device 14 and are allowed to be registered in the returned identification registration authorization information in an associated manner in the HDD 36.

Further, the complex machine 12 is structured such as to receive the input of a certification designation information designating whether or not the certification of the user is allowed on the basis of the ID information and the password information stored in the HDD 36. The received certification designation information is stored in the HDD 36.

When using the complex machine 12, the user inputs the user ID and the password by operating the 10-key keyboard provided in the operation panel 26 or making the IC card in which the ID information is stored be read by the IC card reader 28.

When the input of the user ID and the password is received by operating the 10-key keyboard provided in the operation panel 26 or reading the IC card by the IC card reader 28, the complex machine 12 sends the ID information indicating the user ID and the password information indicating the password to the certification device 14 by the network I/F portion 46 so as to ask for the certification of the user.

The certification device 14 carried out the certification of the user by collating whether or not the ID information and the password information sent from the complex machine 12 are stored in the HDD 36, and sends the result information indicating the result of certification and the identification registration authorization information to the complex machine 12.

When the result information is obtained from the certification device 14, the complex machine 12 carries out the certification of the user in accordance with the result information.

Further, when the allowable user may be identified by the certification device 14, and the registration is allowed in the returned identification registration authorization information, the complex machine 12 registers the ID information of the user and the password information in the associated manner in the HDD 36.

Further, when the result information is not obtained from the certification device 14, and the certification of the user is allowed by collating the ID information and the password information stored in the HDD 36 in the certification designation information stored in the HDD 36, the complex machine 12 carries out the certification of the user on the basis of the ID information and the password information stored in the HDD 36.

Further, the complex machine 12 in accordance with the present exemplary embodiment changes a monitoring time for determining whether or not the complex machine 12 is in the state in which the complex machine 12 is incommunicable from the certification device 14, on the basis of whether or not the certification of the user is allowed by the ID information and the password information stored in the HDD 36, in the certification designation information stored in the HDD 36.

Next, a description will be given of a flow of a detailed process of the complex machine 12 at a time of carrying out the certification of the user.

Figure 4:
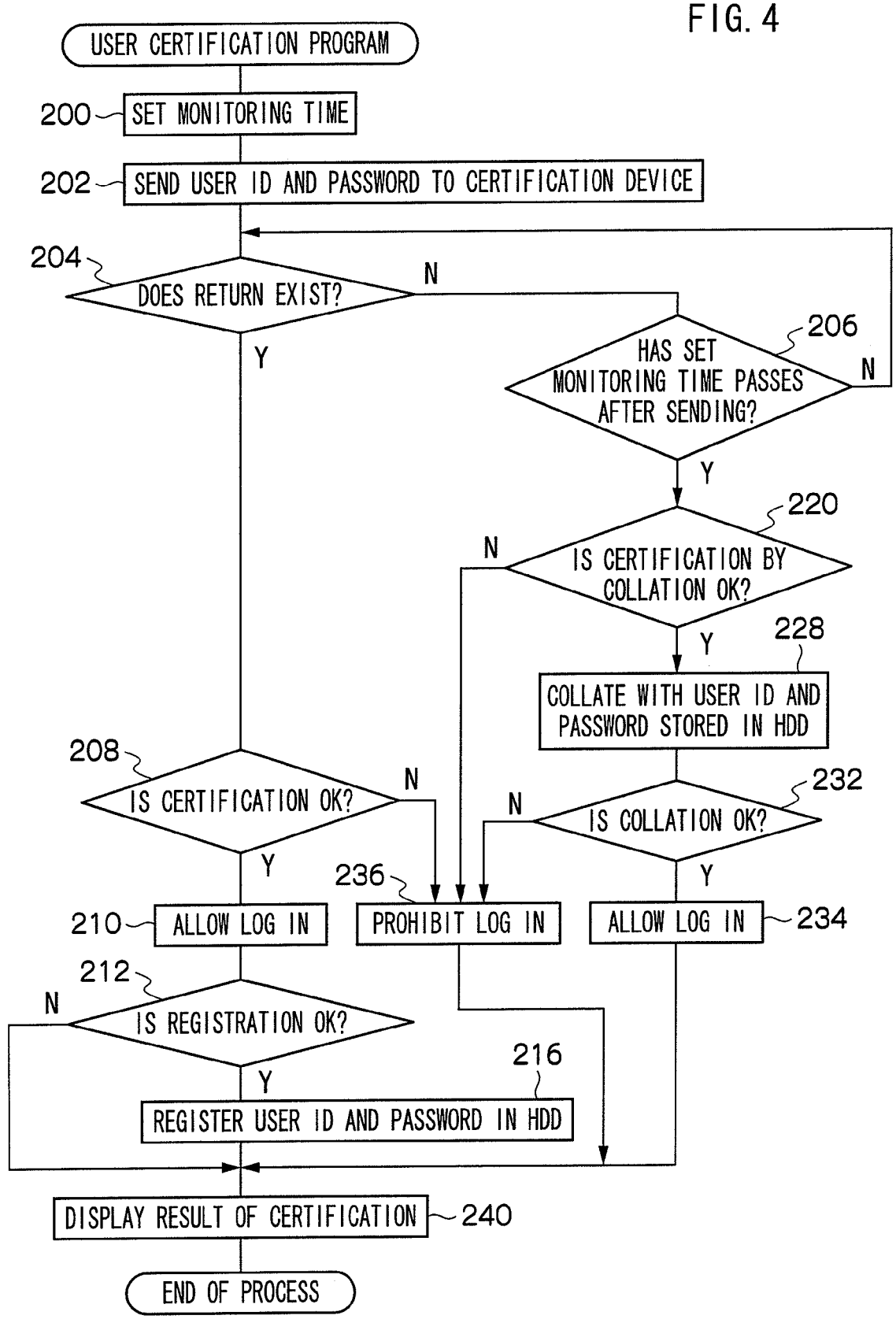
FIG. 4 is a flow chart showing a flow of a process of a user certification program in accordance with a second exemplary embodiment.

FIG. 4 shows a flow chart showing a flow of a process of the user certification program executed by the CPU 30 when the input of the user ID is received by the operation panel 26. In this case, the program is previously stored in a predetermined region of the ROM 32.

When the certification of the user is allowed by the ID information and the password information stored in the HDD 36 in the certification designation information stored in the HDD 36, a step 200 in FIG. 4 sets the monitoring time, for example, to 5 seconds, and when the certification of the user is not allowed, the step 200 sets the monitoring time, for example, to 30 seconds.

In other words, in the complex machine 12 in accordance with the present exemplary embodiment, the monitoring time is shortened when the certification of the user is allowed by the ID information and the password information stored in the HDD 36 in the certification designation information, in comparison with the case that the certification of the user is not allowed. Accordingly, when the incommunicability is generated in the network 16 and the communication with the certification device 14 may not be achieved, the certification of the user is quickly switched to the certification of the user on the basis of the ID information and the password information stored in the HDD 36.

The next step 202 sends the ID information indicating the user ID and the password information indicating the password received by the operation panel 26 to the certification device 14 from the network I/F portion 46 via the network 16 so as to ask for the certification of the user.

The next step 204 determines whether or not the result information and the identification registration authorization information are received by the certification device 14, the step gives way to a step 208 when the result information and the identification registration authorization information are received, and the step gives way to a step 206 when the result information and the identification registration authorization information are not received.

The step 206 determines whether or not a set monitoring time has passed in the step 200 after sending the ID information and the password information in the step 202, the step gives way to a step 220 when an affirmative determination is obtained, and the step gives way to the step 204 so as to wait for receiving the result information and the identification registration authorization information when a negative determination is obtained.

The step 208 determines whether or not the certification of the user to be allowed to use is obtained in the received result information, the step gives way to a step 210 when an affirmative determination is obtained, and the step gives way to a step 236 when a negative determination is obtained.

The step 210 allows to log in the present device so as to validate the operation panel 26, and receives the various operations applied to the operation panel 26.

The next step 212 determines whether or not the registration is allowed in the identification registration authorization information returned from the certification device 14, the step gives way to a step 216 when an affirmative determination is obtained, and the step gives way to a step 240 when a negative determination is obtained.

The step 216 registers the ID information and the password information of the user certified in the step 208 in an associated manner in the HDD 36 so as to be stored.

On the other hand, the step 220 determines whether or not the certification of the user is allowed by collating the ID information and the password information which are stored in the HDD 36 in the certification designation information stored in the HDD 36, the step gives way to a step 228 when an affirmative determination is obtained, and the step gives way to the step 236 when a negative determination is obtained.

The step 228 stores the ID information of the user received by the operation panel 26 in the HDD 36, and carries out the certification whether or not the user is allowed to use, by collating whether or not the password information received by the operation panel 26 matches with the password information associated with the ID information of the user stored in the HDD 36.

The next step 232 determines whether or not the ID information and the password information may be collated, the step gives way to a step 234 when the ID information and the password information are collated, and the step gives way to the step 236 when the ID information and the password information are not collated.

The step 234 allows to log in the present device so as to validate the operation panel 26 and receives the various operations applied to the operation panel 26.

On the other hand, the step 236 prohibits the log-in with respect to the present device so as to invalidate the operation panel 26, and does not receive the various operations applied to the operation panel 26.

Further, the step 240 displays the result of certification on the display portion provided in the operation panel 26, and finishes the present user certification program.

As mentioned above, in accordance with the present exemplary embodiment, a security becomes higher by carrying out the certification while using the user ID and the password.

Further, in accordance with the present exemplary embodiment, since whether or not the certification of the user is allowed may be selected on the basis of the certification designation information, the security becomes higher by carrying out the prohibiting selection as occasion demands.

Further, in accordance with the present exemplary embodiment, when the certification of the user is allowed on the basis of the ID information and the password information which are stored in the HDD 36 in the certification designation information, the certification of the user may be quickly carried out even if the incommunicability is generated in the network 16.

-Third Exemplary Embodiment-

Since the structure of the user certification system 10 in accordance with a third exemplary embodiment, and the structures of the complex machine 12 and the certification device 14 are the same as the first exemplary embodiment (refer to FIGS. 1 and 2), a description thereof will be omitted here.

Next, a description will be given of the certification of the user by the user certification system 10 in accordance with the present exemplary embodiment.

The certification device 14 in accordance with the present exemplary embodiment is structured such as to store the ID information and the password information of the user to be allowed to use each of the previously registered complex machines 12 in an associated manner in the HDD 86.

On the other hand, the complex machine 12 in accordance with the present exemplary embodiment carries out the user certification by using the user ID and the password, in the same manner as the second exemplary embodiment.

Further, the complex machine 12 is structured such as to receive the input of the password registration authorization information indicating whether or not the registration of the password information in the HDD 36 is allowed when the result information is not obtained from the certification device 14, by means of the operation panel 26. The received password registration authorization information is stored in the HDD 36.

When the allowable user is identified by carrying out the user certification, and the registration of the password in the HDD 36 is allowed in the password registration authorization information stored in the HDD 36, the complex machine 12 in accordance with the present exemplary embodiment registers the ID information and the password information of the user in the associated manner in the HDD 36, and may identify the allowable user, and when the registration of the password in the HDD 36 is not allowed in the password registration authorization information, the complex machine 12 registers only the ID information of the user in the HDD 36.

Further, when the complex machine 12 in accordance with the present exemplary embodiment becomes in a state in which the complex machine 12 is incommunicable from the certification device 14, the complex machine 12 detects whether or not a communication cable is physically connected, for example, by detecting a voltage status of a signal line in a physical layer converting portion (a physical layer device (PHY)) to which the communication cable of a network I/F portion 92 is connected, and when the incommunicability is caused by disconnection of the communication cable, the complex machine 12 inhibits the certification of the user on the basis of whether or not the ID information is stored in the HDD 36.

Next, a description will be given a flow of a detailed process of the complex machine 12 at a time of carrying out the certification of the user.

Figure 5:
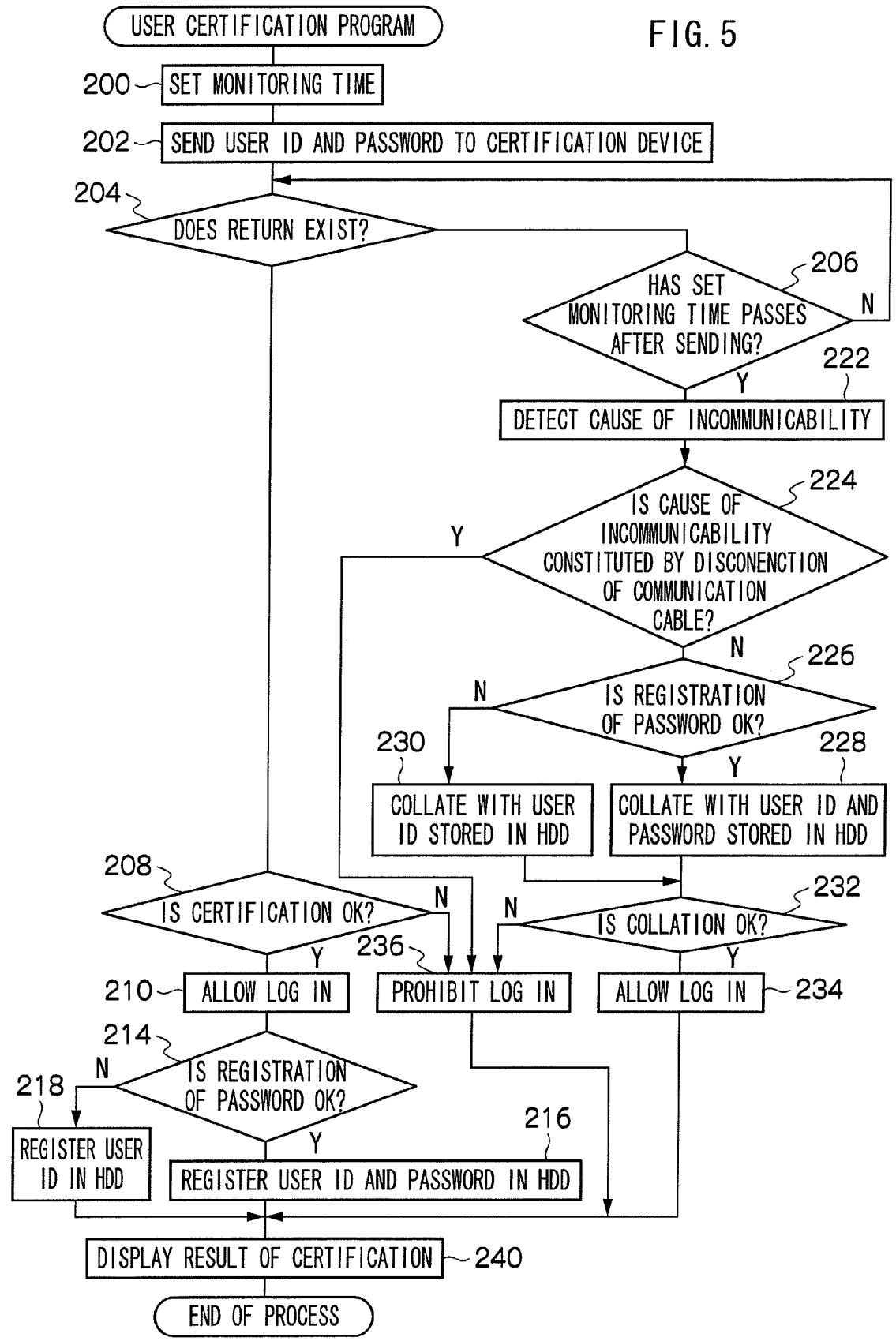
FIG. 5 is a flow chart showing a flow of a process of a user certification program in accordance with a third exemplary embodiment.

FIG. 5 shows a flow chart showing a flow of a process of the user certification program executed by the CPU 30 when the input of the user ID is received by the operation panel 26. In this case, a description of the same process in FIG. 5 as that of FIG. 4 will be omitted by attaching the same reference numerals as those in FIG. 4. Further, the program is previously stored in a predetermined region of the ROM 32.

A step 214 in FIG. 5 determines whether or not the registration of the password in the HDD 36 is allowed in the password registration authorization information stored in the HDD 36, the step gives way to a step 216 when an affirmative determination is obtained, and the step gives way to a step 218 when a negative determination is obtained.

The step 218 registers the ID information of the user certified in the step 208 in the HDD 36 so as to store.

On the other hand, a step 222 detects a cause of the incommunicability.

The next step 224 determines whether or not the incommunicability is caused by the disconnection of the communication cable, the step gives way to a step 236 when an affirmative determination is obtained, and the step gives way to the step 226 when a negative determination is obtained.

Accordingly, for example, even if the communication cable is drawn off with evil intent for carrying out the certification of the user on the basis of the ID information stored in the HDD 36, the certification of the user on the basis of whether or not the ID information is stored in the HDD 36 is inhibited.

The step 226 determines whether or not the registration of the password in the HDD 36 is allowed in the password registration authorization information stored in the HDD 36, the step gives way to the step 228 when an affirmative determination is obtained, and the step gives way to a step 230 when a negative determination is obtained.

The step 230 carries out the certification whether or not the user is allowed to use, by collating whether or not the ID information of the user received by the operation panel 26 is stored in the HDD 36.

As mentioned above, in accordance with the present exemplary embodiment, even if the communication cable is drawn off intentionally, a reduction of the security is suppressed.

Further, in accordance with the present exemplary embodiment, since the selection may be executed such that the password information is not registered in the HDD 36 on the basis of the password registration authorization information, the reduction of the security is suppressed.

In this case, in each of the exemplary embodiments, the description is given when the password registration authorization information is set from the operation panel 26 of the complex machine 12, however, the invention is not limited to this, and the structure may be made, for example, such that the password registration authorization information is sent to the complex machine 12 from the certification device 14.

Further, in each of the exemplary embodiments, the description is given when the complex machine 12 is used as the information processing device, however, the invention is not limited to this, and may be applied to any information processing device as far as the information processing device carries out a communication with the certification device 14 via the network 16 so as to carry out the certification of the user, for example, may be applied to a personal computer.

-Fourth Exemplary Embodiment-

In a structure of a user certification system 10 in accordance with a fourth exemplary embodiment and the structures of the complex machine 12 and the certification device 14, a description of the same portions as those of the first exemplary embodiment (refer to FIGS. 1 and 2) will be omitted.

The complex machine 12 in accordance with the present exemplary embodiment carries out the user certification by using the user ID indicated by the received ID information when receiving an image data instructing a print together with the ID information from the other device via the network 16, and carries out the print of the image shown by the received image date, when the allowable user is identified, in addition to the first exemplary embodiment.

The complex machine 12 is structured such that a personal box may be provided in the HDD 36 as an exclusive storage region per user. In the personal box, for example, there are stored various data such as an image data obtained by reading the image by means of the scanner 22 on the basis of the operation command of the user, an image data sent from the other device operated by the user via the network 16 and the like, as occasion demands.

Further, the complex machine 12 may store an exclusive use program for the user describing an order of a process for sending the image data obtained by reading the image by means of the scanner 22 to the other device via the network 16 and the like.

Further, since the complex machine 12 may not infinitely store the registered ID information in the HDD 36, the ID information stored in the HDD 36 is deleted per predetermined period (for example, one week).

Since the flow of the detailed process of the complex machine 12 at a time of carrying out the certification of the user is the same as the first exemplary embodiment (refer to FIG. 3), a description thereof will be omitted here.

Next, a description will be given of a flow of the detailed process of the complex machine 12 at a time of carrying out the deletion of the ID information stored in the HDD 36.

Figure 6:
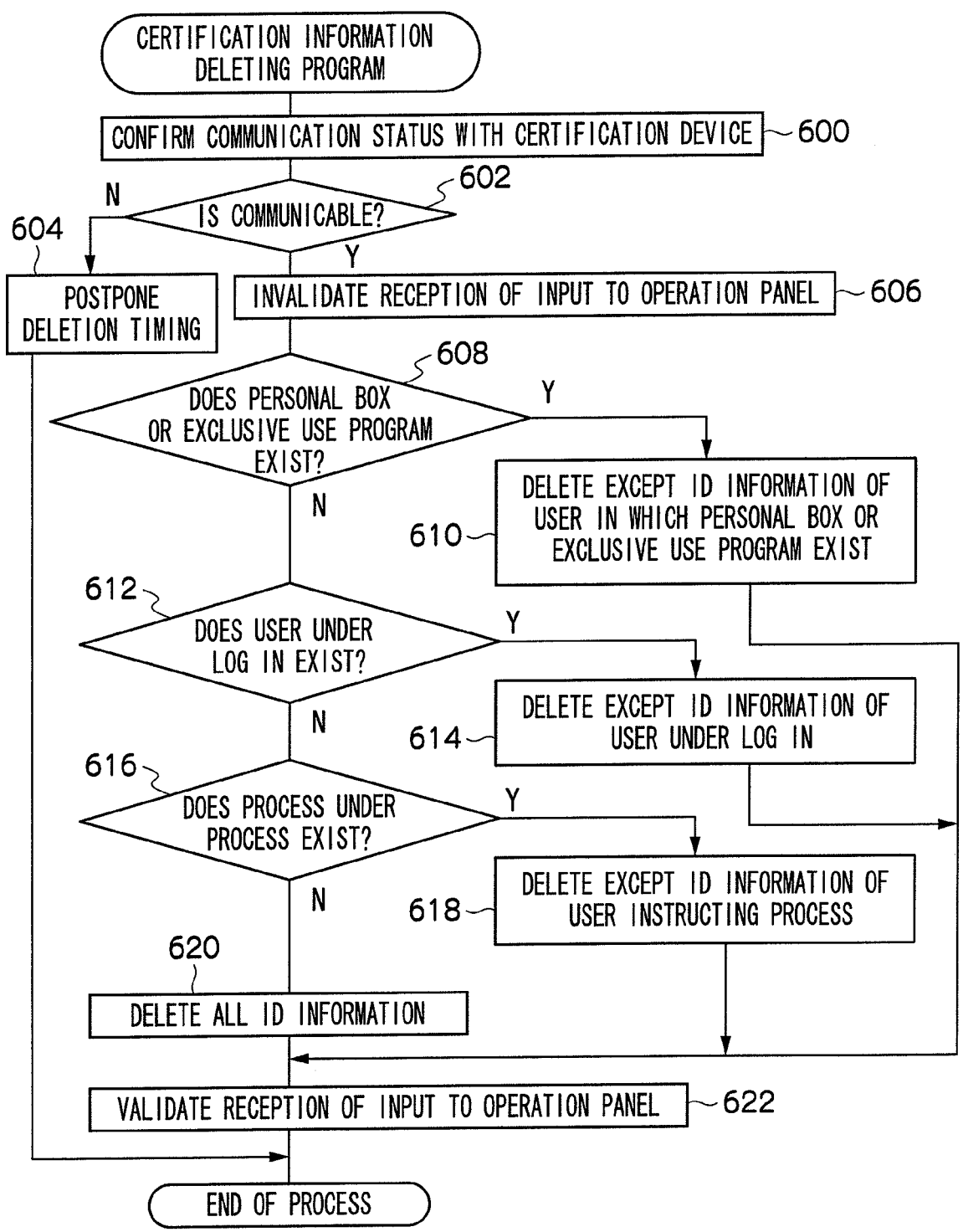
FIG. 6 is a flow chart showing a flow of a process of a certified information deletion program in accordance with a fourth exemplary embodiment.

FIG. 6 shows a flow chart showing a flow of a process of a certification information deletion program executed by the CPU 30 per predetermined period. In this case, the program is previously stored in a predetermined region of the ROM 32.

A step 600 in FIG. 6 identifies a communication status with the certification device, by sending an inquiry information (for example, packet internet groper (PING)) for identifying an operating condition to the certification device 14 from the network I/F portion 46 via the network 16.

The next step 602 determines whether or not being communicated with the certification device 14, the step gives way to a step 606 when an affirmative determination is obtained, and the step gives way to a step 604 when a negative determination is obtained.

The step 604 postpones a timing for deleting the ID information at a predetermined extension period (for example, three days) by setting a timing for starting the next process of the certification information deleting program after the predetermined extension period, and finishes the present certification information deleting program.

On the other hand, the step 606 invalidates the reception of the input with respect to the operation panel 26.

The next step 608 determines whether or not the personal box and the exclusive use program for the user exist in the HDD 36, the step gives way to a step 610 when an affirmative determination is obtained, and the step gives way to a step 612 when a negative determination is obtained.

The step 610 carries out the deletion of all the ID information except the ID information of the user in which the personal box or the exclusive use program exists, among the ID information stored in the HDD 36.

On the other hand, the step 612 determines whether or not there is any user logging in the present device, the step gives way to a step 614 when an affirmative determination is obtained, and the step gives way to a step 616 when the negative determination is obtained.

The step 614 carries out the deletion of all the ID information except the ID information of the log-in user among the ID information stored in the HDD 36.

On the other hand, the step 616 determines whether or not the various processes such as the printing process and the like are carried out, for example, by receiving the image data instructing the print together with the ID information from the other device via the network 16, the step gives way to a step 618 when an affirmative determination is obtained, and the step gives way to a step 620 when a negative determination is obtained.

The step 618 carries out the deletion of all the ID information except the ID information of the user instructing the various processes, in the ID information stored in the HDD 36.

On the other hand, the step 620 carries out the deletion of all the ID information stored in the HDD 36.

The next step 622 validates the receipt of the input with respect to the operation panel 26, and finishes the present certification information deleting program.

As mentioned above, in accordance with the present exemplary embodiment, even when the network 16 is incommunicable, the certification of the user may be carried out while suppressing a man hour for the management by the manager. Further, since the ID information of the user of which the registration is deleted because the user is not allowed to use is not kept up being stored in the HDD 36, in the certification device 14, the reduction of the security may be suppressed.

-Fifth Exemplary Embodiment-

In a structure of a user certification system 10 in accordance with a fifth exemplary embodiment and the structures of the complex machine 12 and the certification device 14, a description of the same portions as those of the fourth exemplary embodiment (refer to FIGS. 1 and 2) will be omitted.

Further, the user certification system 10 in accordance with the present exemplary embodiment stores the ID information indicating the user ID in which the certification device 14 is registered, in the HDD 86, and carries out the process (refer to FIG. 3) of the user certification program when the input of the user ID is received by the operation panel 26 in the complex machine 12, in the same manner as the fourth exemplary embodiment, and is different in the following points.

The complex machine 12 in accordance with the present exemplary embodiment registers the ID information of the certified user together with a certified date and hour at which the certification is obtained so as to store, when the user allowed to use is certified on the basis of the result information, and updates only the certified date and hour when the ID information is already stored in the HDD 36. Accordingly, the final certified date and hour at which the certification indicating that the user of the ID information is the user allowed to use is obtained at the end is stored HDD 36 per ID information.

Further, the complex machine 12 deletes the ID information which has passed for a predetermined retention period (for example, two weeks) from the final certification date and hour from the HDD 36 per predetermined period (for example, one week).

Figure 7:
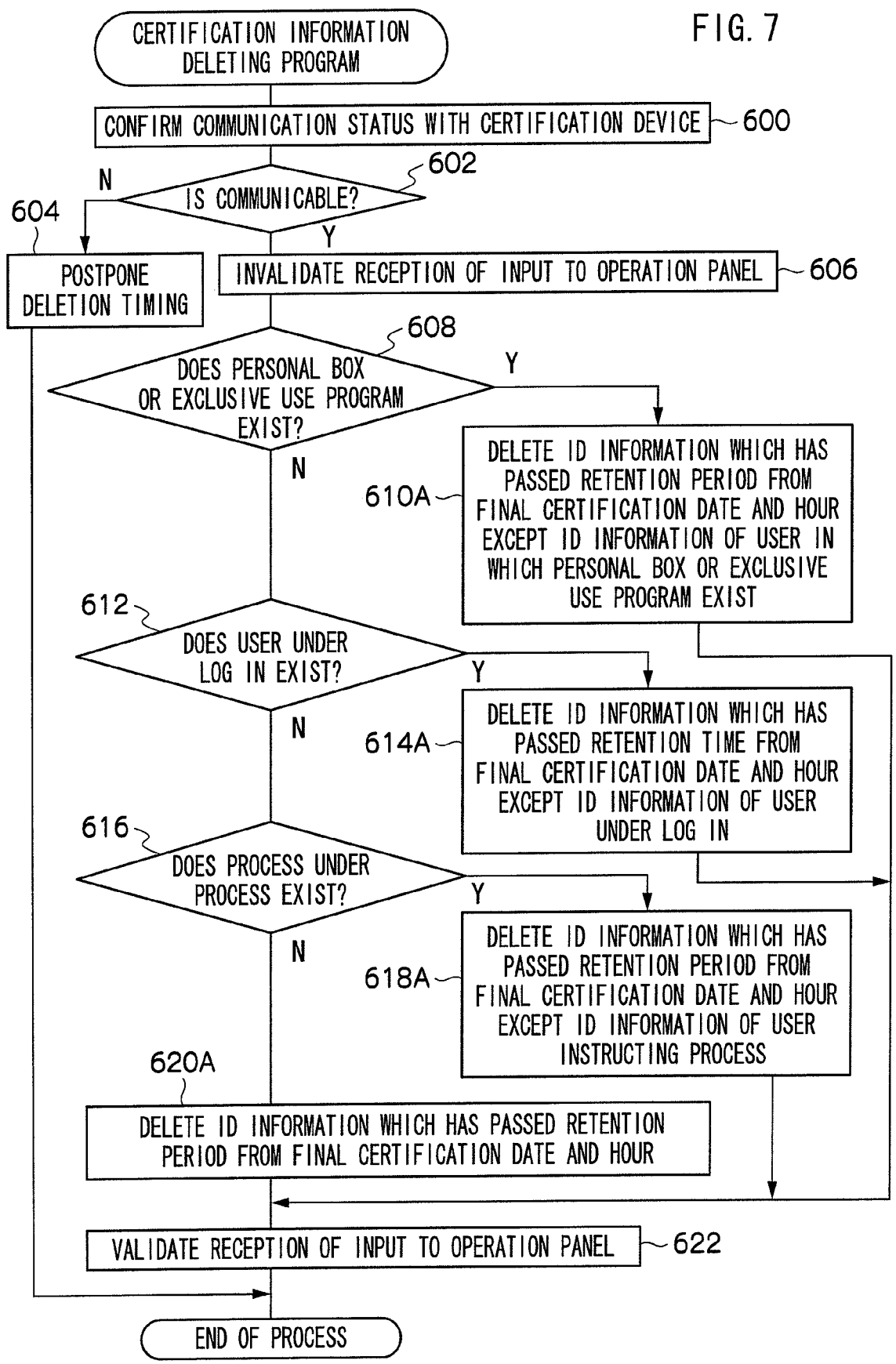
FIG. 7 is a flow chart showing a flow of a process of a certified information deletion program in accordance with a fifth exemplary embodiment.

FIG. 7 shows a flow chart showing a flow of a process of the certification information deleting program executed by the CPU 30 per predetermined period. In this case, the same reference numerals are attached to the same processes as the processes of the certification information deleting program (refer to FIG. 6) in accordance with the fourth exemplary embodiment, and a description thereof will be omitted here, and a description will be given by attaching "A" to the reference numerals of only the different processes.

A step 610A carries out a deletion of the ID information which has passed for the retention period from the final certification date and hour, except the ID information of the user in which the personal box or the exclusive use program exists, among the ID information stored in the HDD 36.

A step 614A carries out the deletion of the ID information which has passed for the retention period from the final certification date and hour except the ID information of the log-in user, among the ID information stored in the HDD 36.

A step 618A carries out the deletion of the ID information which has passed for the retention period from the final certification date and hour, except the ID information of the user instructing the various processes, among the ID information stored in the HDD 36.

Further, a step 620A carries out the deletion of the ID information which has passes for the retention period from the final certification date and hour stored in the HDD 36.

As mentioned above, in accordance with the present exemplary embodiment, since the ID information in which the final certification date and hour is old is deleted, the certification of the user using the present device may be stably carried out recently even when the network 16 is incommunicable.

-Sixth Exemplary Embodiment-

In a user certification system 10 in accordance with a sixth exemplary embodiment and the structures of the complex machine 12 and the certification device 14, a description of the same portions as those of the fourth exemplary embodiment (refer to FIGS. 1 and 2) will be omitted.

Further, the user certification system 10 in accordance with the present exemplary embodiment stores the ID information indicating the user ID in which the certification device 14 is registered, in the HDD 86, and carries out the process (refer to FIG. 3) of the user certification program when the input of the user ID is received by the operation panel 26 in the complex machine 12, in the same manner as the fourth exemplary embodiment, and is different in the following points.

The complex machine 12 in accordance with the present exemplary embodiment is provided in the HDD 36 with a storage region for storing the ID information which may registers a predetermined number of (for example, one thousand) ID information and registration date and hour at which the ID information is registered.

When the user allowed to use is certified on the basis of the result information, the complex machine 12 registers the ID information of the certified user together with the registered date and hour in the HDD 36 so as to store.

Further, the complex machine 12 deletes the oldest registered identification information from the storage means per a predetermined period (for example, one week).

Figure 8:
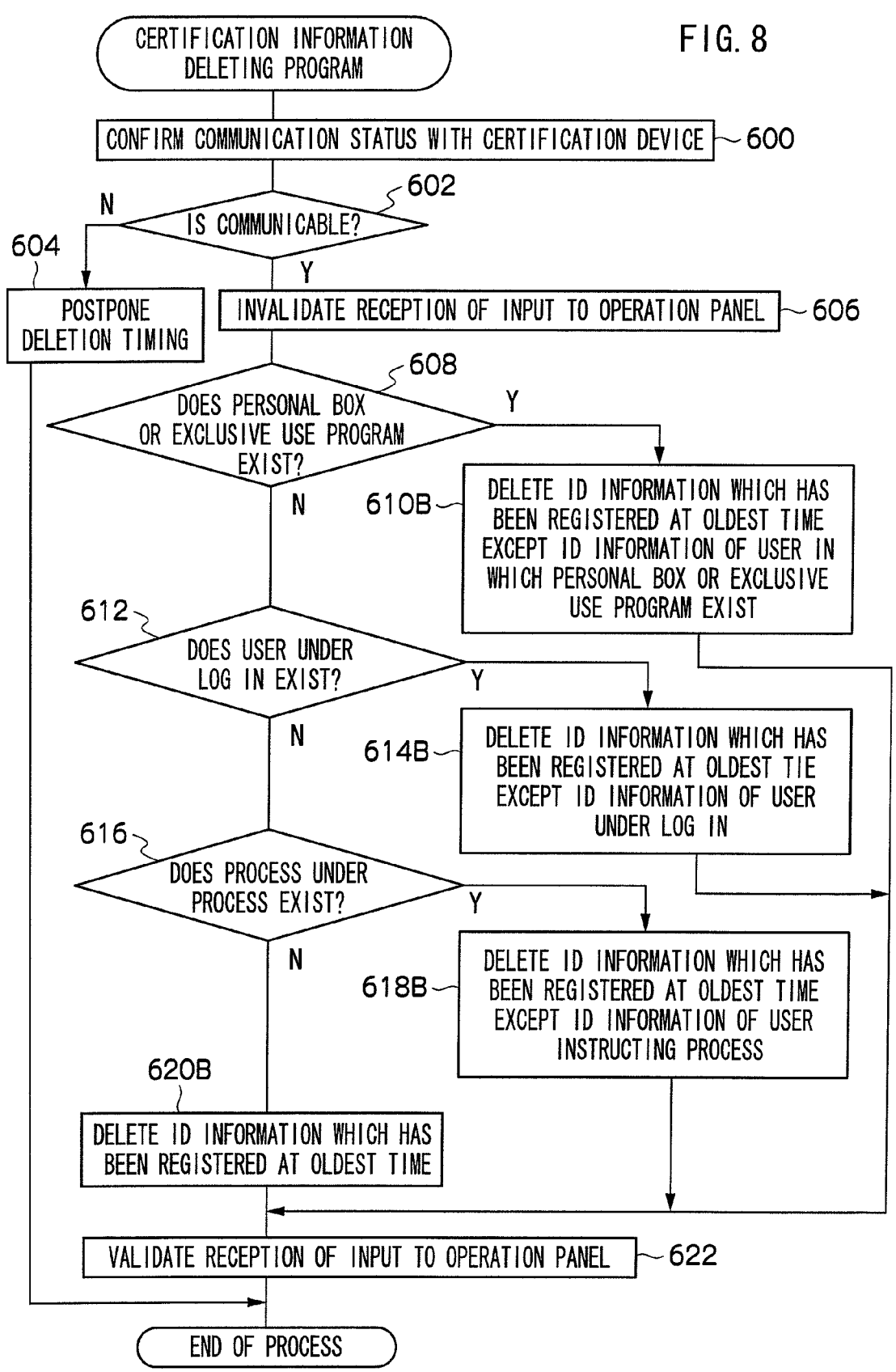
FIG. 8 is a flow chart showing a flow of a process of a certified information deletion program in accordance with a sixth exemplary embodiment.

FIG. 8 shows a flow chart showing a flow of a process of a certification information deleting program executed by the CPU 30 per predetermined period. In this case, the same reference numerals are attached to the same processes as the processes of the certification information deleting program (refer to FIG. 6) in accordance with the fourth exemplary embodiment, and a description thereof will be omitted here, and a description will be given by attaching "B" to the reference numerals of only the different processes.

A step 610B carries out a deletion of the ID information which has been registered at the oldest time, except the ID information of the user in which the personal box or the exclusive use program exists, in the ID information stored in the HDD 36.

A step 614B carries out the deletion of the ID information which has been registered at the oldest time except the ID information of the log-in user, among the ID information stored in the HDD 36.

A step 618B carries out the deletion of the ID information which has been registered at the oldest time, except the ID information of the user instructing the various processes, among the ID information stored in the HDD 36.

Further, a step 620B carries out the deletion of the ID information which has been registered at the oldest time and is stored in the HDD 36.

As mentioned above, in accordance with the present exemplary embodiment, since the ID information which has been registered at the oldest time is deleted, the certification of the user using the present device may be stably carried out recently even when the network 16 is incommunicable.

-Seventh Exemplary Embodiment-

In a user certification system 10 in accordance with a seventh exemplary embodiment and the structures of the complex machine 12 and the certification device 14, a description of the same portions as those of the fourth exemplary embodiment (refer to FIGS. 1 and 2) will be omitted.

Further, the user certification system 10 in accordance with the present exemplary embodiment stores the ID information indicating the user ID in which the certification device 14 is registered, in the HDD 86, and carries out the process (refer to FIG. 3) of the user certification program when the input of the user ID is received by the operation panel 26 in the complex machine 12, in the same manner as the fourth exemplary embodiment, and is different in the following points.

The complex machine 12 in accordance with the present exemplary embodiment registers a certification frequency at which the certification is obtained during a fixed period (for example, one week) as a frequency information indicating a frequency at which the certification of the user of the ID information is obtained, together with the ID information of the certified user in the HDD 36 so as to store, when the user to be allowed to use is certified on the basis of the result information.

Further, the complex machine 12 deletes the ID information in which the certification frequency is equal to or less than a predetermined frequency from the HDD 36 per a predetermined period (for example, one week).

Figure 9:
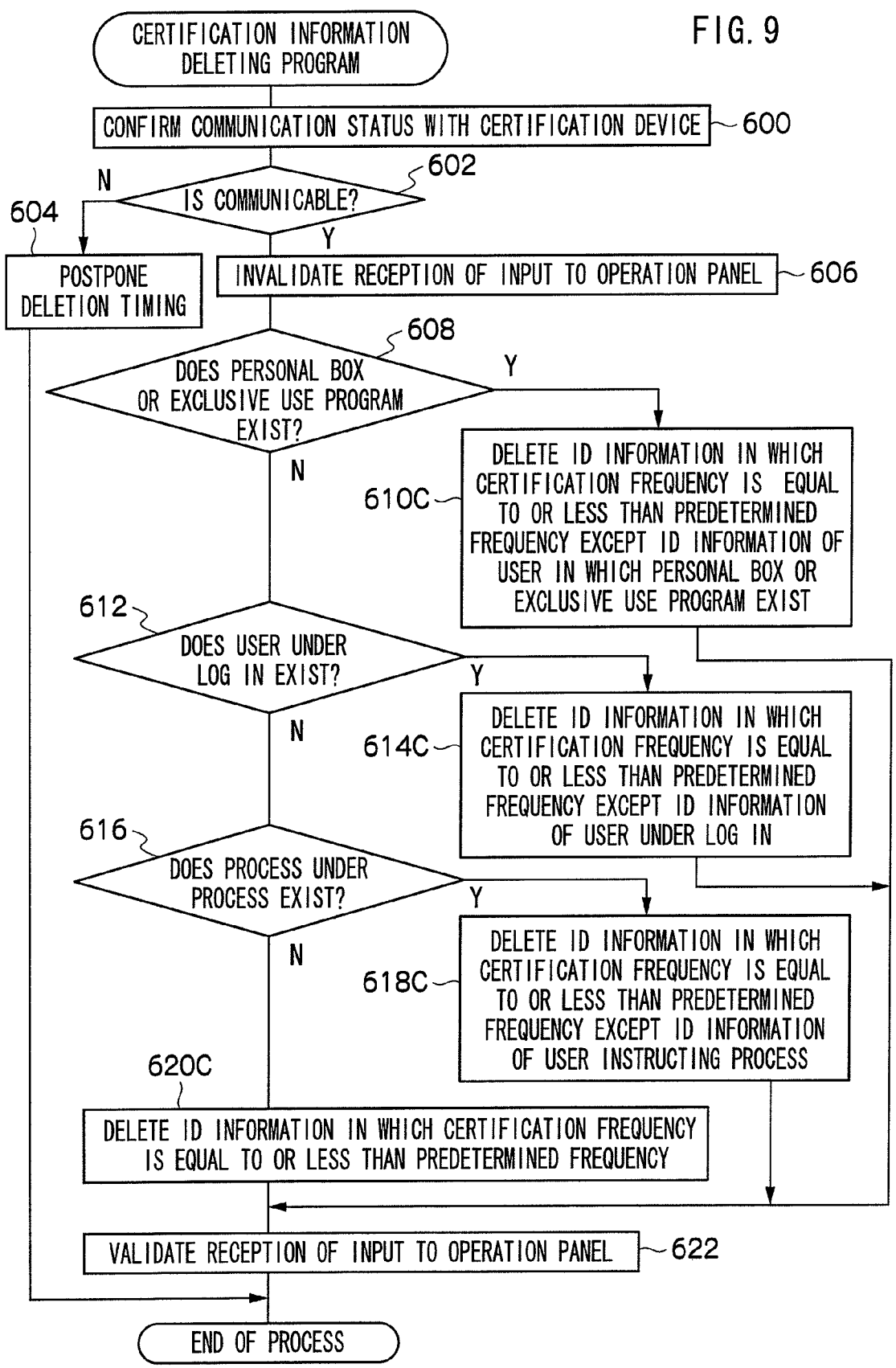
FIG. 9 is a flow chart showing a flow of a process of a certified information deletion program in accordance with a seventh exemplary embodiment.

FIG. 9 shows a flow chart showing a flow of a process of a certification information deleting program executed by the CPU 30 per predetermined period. In this case, the same reference numerals are attached to the same processes as the processes of the certification information deleting program (refer to FIG. 6) in accordance with the fourth exemplary embodiment, and a description thereof will be omitted here, and a description will be given by attaching "C" to the reference numerals of only the different processes.

A step 610C carries out a deletion of the ID information in which the certification frequency is equal to or less than the predetermined frequency, except the ID information of the user in which the personal box or the exclusive use program exists, in the ID information stored in the HDD 36.

A step 614C carries out the deletion of the ID information in which the certification frequency is equal to or less than the predetermined frequency except the ID information of the log-in user, among the ID information stored in the HDD 36.

A step 618C carries out the deletion of the ID information in which the certification frequency is equal to or less than the predetermined frequency, except the ID information of the user instructing the various processes, among the ID information stored in the HDD 36.

Further, a step 620C carries out the deletion of the ID information in which the certification frequency is equal to or less than the predetermined frequency and is stored in the HDD 36.

As mentioned above, in accordance with the present exemplary embodiment, since the ID information in which a frequency in use is low is deleted, and the ID information of the user in which the frequency in use is high is retained, the certification of the user in which the frequency in use is high may be stably carried out even when the network 16 is incommunicable.

In this case, in each of the exemplary embodiments, the description is given when the timing carrying out the deletion of the identification information is set to the predetermined period, however, the invention is not limited to this, for example, the deletion of the identification information may be carried out when any empty region capable of storing the ID information does not exist in the storage region for storing the ID information.

Further, in each of the exemplary embodiments, the description is given when the certification is carried out on the basis of the user ID as the identification information, however, the invention is not limited to this, and may be structured such that the certification is carried out by using the user ID and the password.

In other words, the structure is made such as to receive the input of the password information indicating the password of the user together with the user ID of the user by the operation panel 26, and store the previously registered ID information and password information in an associated manner in the HDD 36. Further, when the input of the ID information and the password information is received by the operation panel 26, the device asks for the certification by sending the ID information and the password information to the certification device 14 by the network I/F portion 46, the ID information received by the operation panel 26 is stored in the HDD 36 when the result information is not obtained, the certification is carried out on the basis of whether or not the password information received by the operation panel 26 matches with the password information associated with the ID information stored in the HDD 36, and the certified ID information and password information are registered in the HDD 36 when the user to be allowed to use is certified on the basis of the result information. Further, the ID information stored in the HDD 36 and the password information associated with the ID information may be deleted per predetermined period of when the empty region capable of storing the ID information does not exist in the storage region for storing the ID information in the HDD 36.

Further, the sixth exemplary embodiment describes about the case that the identification information of the user which has been registered at the old time is deleted, and the seventh exemplary embodiment described about the case of deleting the identification information of the user in which the certification frequency certified for the fixed time is small as a frequency, however, the invention is not limited to this, and for example, may be structured such as to extract the ID information from the HDD 36 in the order that the registered date and hour is older and delete a predetermined number of ID information from the HDD 36 in the order that the certification frequency is small, from the extracted ID information. Further, the structure may be made such as to extract the ID information from the HDD 36 in the order that the certified frequency is smaller, and delete a predetermined number of ID information from the HDD 36 in the order that the registered date and hour is older, from the extracted ID information.

Further, in each of the exemplary embodiments, the description is given when the complex machine 12 is used as the information processing device, however, the invention is not limited to this, and may employ any information processing device as far as the information processing device carried out the certification of the user by communicating with the certification device 14 via the network 16. For example, the invention may employ a personal computer.

-Eighth Exemplary Embodiment-

Since the structure of the user certification system 10 in accordance with an eighth exemplary embodiment is the same as the first exemplary embodiment (refer to FIGS. 1 and 2), a description thereof will be omitted. Further, in the structures of the complex machine 12 and the certification device 14, a description of the same portions as those of the first exemplary embodiment (refer to FIGS. 1 and 2) will be omitted.

The ID information for certifying the user and an authority information indicating an authority on use given to the user are stored in an associated manner per user previously allowed to use with respect to the image processing device 12, in the HDD 86 of the certification device 14 in accordance with the present exemplary embodiment. In this case, the authority information in accordance with the present exemplary embodiment is constituted, for example, by an information indicating whether or not a fax transmission function may be used, an information indicating whether or not a scanner function may be used, an information indicating whether or not a print function may be used, an information indicating whether or not a color printing in a print function may be used, an information indicating a maximum usable sheets number of the recording paper for a predetermined period (for example, per week) when the print function is set to be usable, and the like.

Next, a description will be given of a process of the image processing device 12 in accordance with the present exemplary embodiment.

Figure 10:
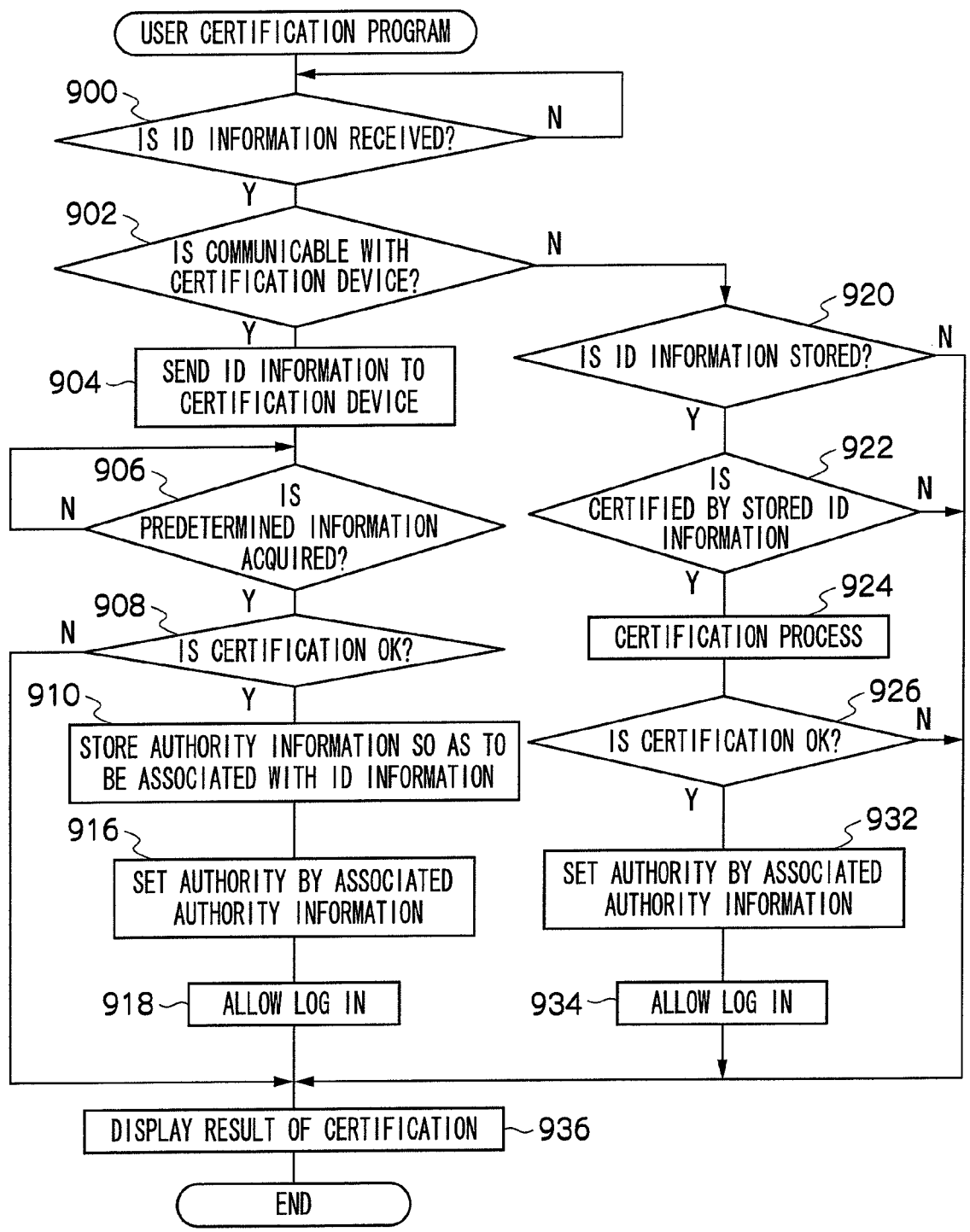
FIG. 10 is a flow chart showing a flow of a process of a user certification program in accordance with an eighth exemplary embodiment.

First, a description will be given of a user certification process executed by the image processing device 12 with reference to FIG. 10. In this case, FIG. 10 is a flow chart showing a flow of a process of a user certification program executed by the CPU 30 in the case of being set to an external certification mode carrying out the certification by the certification device 14. In this case, a description will be given on the assumption that the user certification program in accordance with the present exemplary embodiment is previously stored in a predetermined region of the ROM 32 corresponding to a recording media, however, is not limited to this, and may be previously stored in the HDD 36 or a predetermined region of the other recording media.

First, a step 900 comes to a waiting state until the ID information is received by the operation panel 26, and the step gives way to a step 902 if the ID information is received by the operation panel 26.

The next step 902 determines whether or not the certification device 14 may be communicated by the network I/F 46, the step gives way to a step 904 when an affirmative determination is obtained, and the step gives way to a step 920 when a negative determination is obtained. In the present exemplary embodiment, in order to determine whether or not the certification device 14 may be communicated, the determination is carried out by sending a demand signal for demanding a transmission allowance of the ID information to the certification device 14 from the network I/F 46 and on the basis of whether or not the network I/F 46 receives an allowance signal sent from the certification device 14 in correspondence with the demand signal, however, the other methods may be employed as the method for determining whether or not the certification device 14 may be communicated.

The next step 904 sends the ID information received by the operation panel 26 to the certification device 14. Accordingly, the certification device 14 carries out the certification by collating the ID information received by the operation panel 26 with the certification information stored in the HDD 86 of the certification device 14, and sends a certification result information indicating the result of certification to the image processing device 12.

The next step 906 waits until the predetermined information is acquired in the network I/F 46, and the step gives way to a step 908 if the certification result information mentioned above is acquired as a predetermined information.

The next step 908 determines whether or not the certification may be carried out on the basis of the result shown by the certification result information sent from the certification device 14, the step gives way to a step 910 when an affirmative determination is obtained, and the step gives way to a step 936 when a negative determination is obtained, thereby displaying the certification result indicating that the certification may not be carried out by the ID information received by the operation panel 26 on the operation panel, and finishing the present user certification program.

In this case, when sending the certification result information indicating that the certification is achieved to the image processing device 12, the certification device 14 in accordance with the present exemplary embodiment sends the authority information associated with the ID information received by the operation panel 26 to the image processing device 12.

The next step 910 stores the ID information received by the operation panel 26 and the authority information associated with the ID information in he associated manner in the HDD 36.

In this case, if the authority information is not stored in the certification device 14, when the image processing device 12 in accordance with the present exemplary embodiment is determined that it may be communicated with the certification device 14 and when the image processing device 12 is certified by collating the certification information received by the operation panel 26 with the certification information stored in the certification device 14, the image processing device 12 stores a specific authority information indicating an authority on a specific use which has been previously defined as an alternative of the authority information in the HDD 36 so as to be associated with the ID information. In this case, the case that the authority information is not stored in the certification device 14 includes a case that the authority information associated with the ID information does not correspond to the present image processing device 12 and the like in addition to the case that the authority information is not associated with the ID information.

Further, the specific authority information is previously stored in the predetermined region of the HDD 36, and the specific authority information may employ, for example, an information indicating that only the fax transmission function may be used, an information indicating that only the print function may be used, and the other information indicating the authority on use.

The next step 916 carries out a setting of the authority on the basis of the authority information which is associated with the ID information and is sent from the certification device 14, and limits the user of the present image processing device 12 by the user to the user within the range of the authority indicated by the authority information.

The next step 918 allows to log in the present image processing device 12, gives way to a step 936, displays the certification result indicating that the certification may be achieved on the basis of the ID information received by the operation panel 26, and finishes the present user certification program.

On the other hand, the case of giving way to the step 920 corresponds to a case that the image processing device 12 is incommunicable from the certification device 14, and the step 920 determines whether or not one or more ID information is stored in the HDD 36, the step gives way to a step 922 when an affirmative determination is obtained, and the step gives way to the step 936 when a negative determination is obtained, displays the certification result indicating that the certification may not be achieved on the basis of the ID information received by the operation panel 26 on the operation panel, and finishes the present user certification program.

The step 922 determines whether or not it is set such that the ID information received by the operation panel 26 is collated with the ID information stored in the image processing device 12, the step gives way to a step 924 when an affirmative determination is obtained, and the step gives way to the step 936 when a negative determination is obtained, displays the certification result indicating that the certification may not be achieved on the basis of the ID information received by the operation panel 26 on the operation panel 26, and finishes the present user certification program.

The step 924 carries out the certification process by collating the ID information received by the operation panel 26 with the ID information stored in the HDD 36.

The next step 926 determines whether or not the certification is achieved on the basis of the certification process by the step 924, the step gives way to a step 932 when an affirmative determination is obtained, and the step gives way to the step 936 when a negative determination is obtained, displays the certification result indicating that the certification may not be achieved on the basis of the ID information received by the operation panel 26, and finishes the present user certification program.

The step 932 sets the authority on the basis of the authority information which is associated with the ID information and is stored in the HDD 36, and limits the use of the present image processing device 12 by the user to the user within the range of the authority indicated by the authority information.

The next step 934 allows to log in the present image processing device 12, gives way to the step 936, displays the certification result indicating that the certification is achieved on the basis of the ID information received by the operation panel 26 on the operation panel, and finishes the present user certification program.

-Ninth Exemplary Embodiment-

In the present ninth exemplary embodiment, a description will be given of an exemplary embodiment when an authority on use given to the user is limited on the basis of a different authority information from the authority information associated with the certified ID information. In this case, since a user certification system 10 in accordance with the ninth exemplary embodiment, and the structures of the image processing device 12 and the certification device 14 are the same as the structures in accordance with the eighth exemplary embodiment (refer to FIGS. 1 and 2), a description thereof will be omitted.

In this case, the HDD 36 of the image processing device 12 in accordance with the present exemplary embodiment stores a different authority information (hereinafter, refer to as "second authority information") which is independent from the authority information associated with the stored ID information.

In this case, as the second authority information, there is exemplified an information indicating that the fax transmission is enabled by inputting the fax number by the 10-key keyboard provided in the operation panel 26, however, the second authority information is not limited to this, and the second authority information may employ any one of the information indicating that the scanner function may be used, the information indicating that the print function may be used, the information indicating that the color printing in the print function may be used, the information indicating that no upper limit is provided in the maximum usable sheet number of the recording papers and the like, or may employ an aspect that plural information are combined from the information mentioned above.

Next, a description will be given of an operation of the image processing device 12 in accordance with the present exemplary embodiment.

Figure 11:
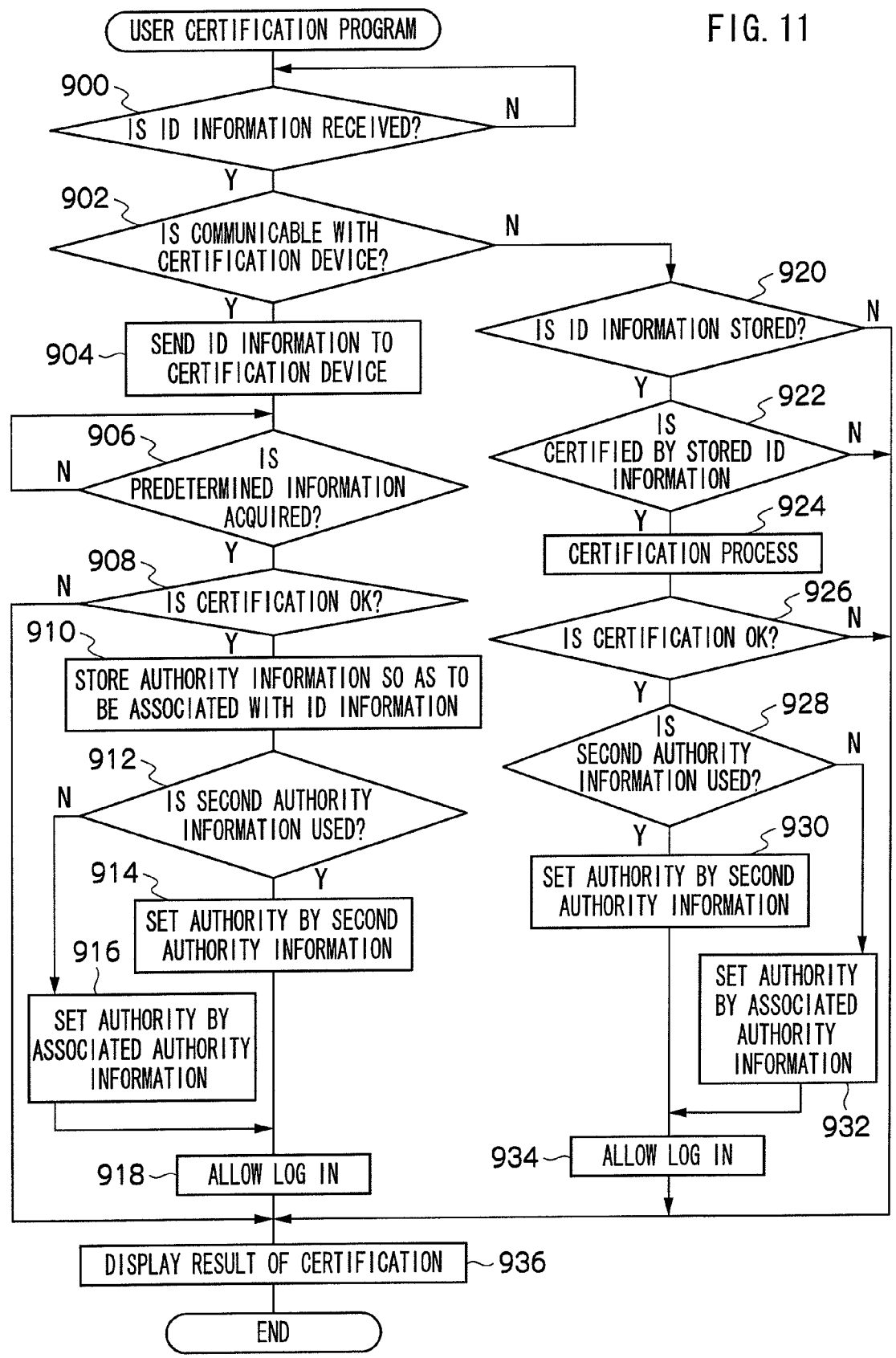
FIG. 11 is a flow chart showing a flow of a process of a user certification program in accordance with a ninth exemplary embodiment.

A description will be given first of the user certification process executed by the image processing device 12 with reference to FIG. 11. In this case, FIG. 11 is a flow chart showing a flow of a process of a user certification program executed by the CPU 30 in the case of being set to an external portion certification mode carrying out the certification by the certification device 14. In this case, the description is given on the assumption that the user certification program in accordance with the present exemplary embodiment is previously stored in a predetermined region of the ROM 32 corresponding to the recording media, however, the user certification program may be previously stored in the HDD 36 or a predetermined region of the other recording media, without being limited to this. Further, the same reference numerals are attached to the same steps as those of the flow chart in FIG. 10 in accordance with the eighth exemplary embodiment and a description thereof will be omitted.

A step 912 determines whether or not the second authority information previously stored in the HDD 36 is used, the step gives way to a step 914 when an affirmative determination is obtained, and the step gives way to a step 916 when a negative determination is obtained. In this case, in the present exemplary embodiment, a display for making the user select whether or not the user uses the second authority information is displayed on the operation panel 26, and the determination by the step 912 is carried out on the basis of the selection information indicating the result of selection input by the user.

The step 914 carries out the setting of the authority on the basis of the second authority information in place of the authority information which is associated with the ID information received by the operation panel 26 and is sent from the certification device 14, and limits the use of the present image processing device 12 by the user to the use within the range of the authority indicated by the second authority information.

Accordingly, for example, even in the user that the fax transmission is allowed only to the fax number end previously stored in the image processing device 12 as the authority on use of the image processing device 12, the fax transmission may be achieved by inputting the fax number by the 10-key keyboard provided in the operation panel 26.

On the other hand, a step 928 determines whether or not the second authority information previously stored in the HDD 36 is used, the step gives way to a step 930 when an affirmative determination is obtained, and the step gives way to a step 932 when a negative determination is obtained.

The step 930 carries out the setting of the authority on the basis of the second authority information in place of the authority information which is associated with the ID information received by the operation panel 26 and is stored in the HDD 36, and limits the use of the present image processing device 12 by the user to the user within the range of the authority indicated by the second authority information.

In this case, the second authority information in accordance with the present exemplary embodiment is exemplified by one kind, however, is not limited to this, may be set to an aspect that when plural kinds of second authority information are stored in the HDD 36 and the user selects using the second authority information, the necessary second authority information indicating the authority on use is selected from the plural kinds of stored second authority information.

As mentioned above, in accordance with the present exemplary embodiment, the function the user of which is limited in the authority information may be used by using the second authority information which is different from the authority information associated with the ID information.

The description is given above of the invention by using each of the exemplary embodiments, however, the technical range of the invention is not limited to the range described in each of the exemplary embodiments. Various changes or modifications may be applied to each of the exemplary embodiments within the scope of the invention, and the aspects including the changes or modifications are included in the technical scope of the invention.

Further, each of the exemplary embodiments does not limit the invention in accordance with claims, and all of the combinations of the features described in the exemplary embodiments are not necessarily essential for the solving means of the invention. The exemplary embodiments mentioned above include various stages of inventions, and various inventions may be extracted on the basis of the combination of plural disclosed constituting elements. Even if some constituting elements are deleted from all the constituting elements shown in each of the exemplary embodiments, the structure in which some constituting elements are deleted may be extracted.

For example, in each of the exemplary embodiments, the description is given when the image processing device 12 is applied as the information processing device, however, the invention is not limited to this, and for example, may be structured as an aspect that the other device such as a personal computer, a server computer or the like is applies as the information processing device as far as the information processing device which communicates with the certification device 14 via the communication line 16 so as to certify the user.

Further, in each of the exemplary embodiments, the description is given when the certification device 14 carries out the certification by collating the ID information received by the operation panel 26 with the ID information stored in the certification device 14, however, the invention is not limited to this, and may be structured, for example, such that the certification is carried out by the image processing device 12.

Further, in each of the exemplary embodiments, the description is given when the input of the ID information indicating the user ID or the password is received by the operation panel 26, however, the invention is not limited to this, and may be structured, for example, such that the input of the ID information is received by reading the IC card by the IC card reader 28.

In addition, the user certification system 10, and the structures of the image processing device 12 and the certification device 14 (refer to FIGS. 1 and 2) described in each of the exemplary embodiments correspond to one example, and it goes without saying that an unnecessary portion may be deleted or a new portion may be added within the scope of the invention.

Further, the flow (refer to FIGS. 10 and 11) of the process of the user certification program described in each of the exemplary embodiments corresponds to one example, and it goes without saying that an unnecessary step may be deleted, a new step may be added, or a processing order may be replaced within the scope of the invention.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a reception portion that receives input identification information that identifies a user;
   a communication portion that transmits the identification information to a certification device which determines whether the user has permission to use the information processing device;
   a storage portion;
   a registration portion that stores the identification information in the storage portion, in response to the certification device determining that the user has permission to use the information processing device;
   a certification portion that determines whether the information processing device is unable to communicate with the certification device and determines whether the user has permission to use the information processing device based on the identification information stored in the storage portion, in response to determining the information processing device is unable to communicate with the certification device;
   a detection portion that detects a cause of non-communication when the certification device cannot be communicated with; and
   a prohibition portion that prohibits the certification portion from determining whether the user has permission to use the information processing device based on whether the identification information is stored in the storage portion, when the cause of the non-communication is a predetermined cause.

2. The information processing device according to claim 1, wherein:
   the reception portion further receives input certification designation information which designates whether the user has certification of permission based on whether the identification information is stored in the storage portion;
   the storage portion stores the certification designation information received by the reception portion, and
   when the certification designation information stored in the storage portion indicates that the user has certification of permission, and the information processing device is unable to communicate with the certification device, the certification portion determines whether the user has permission to use the information processing device based on whether the identification information is stored in the storage portion.

3. An information processing device comprising:
   a reception portion that receives input identification information that identifies a user;
   a communication portion that communicates with transmits the identification information to a certification device which determines whether the user has usage permission to use the information processing device;
   a storage portion;
   a registration portion that stores the identification information in the storage portion, in response to the certification device determining that the user has permission to use the information processing device;
   a certification portion that determines whether the information processing device is unable to communicate with the certification device and determines whether the user has permission to use the information processing device based on the identification information stored in the storage portion, in response to determining the information processing device is unable to communicate with the certification device,
   wherein the reception portion further receives input certification designation information which designates whether the user has certification of permission based on whether the identification information is stored in the storage portion and the storage portion stores the certification designation information received by the reception portion, and
   wherein when the certification designation information stored in the storage portion indicates that the user has certification of permission, the certification portion sets a length of a monitoring time for monitoring a communication status of the certification device, to determine whether the information processing device is unable to communicate with the certification device, to be shorter than a monitoring time for a case in which the user does not have certification of permission.

4. The information processing device according to claim 1, wherein the predetermined cause is the disconnection of a communication cable, and
   wherein the detection portion detects whether the communication cable is physically connected by detecting a voltage status of a signal line.

5. The information processing device according to claim 1, wherein:
   in response to a request for user certification from the certification portion, the certification device returns result information, and also returns identification registration permission information that indicates whether the registration of the user's identification information in the storage portion is authorized, and
   the registration portion stores the identification information in the storage portion, when that the result information indicates the user has permission has been obtained, and when the identification registration permission information indicates permission for registration.

6. The information processing device according to claim 1, wherein:
   the reception portion receives input password information that indicates a password of the user, in conjunction with the identification information;
   the storage portion associatively stores the identification information with the password information;
   when the reception portion receives the input of the identification information and the password information, and the communication portion requests certification by sending the identification information and the password information to the certification device, and when the information processing device is unable to communicate with the certification device, the certification portion stores the identification information in the storage portion and performs certification based on whether or not the input password information matches the password information associated with the identification information stored in the storage portion, and when that the certification device determines the user has permission, the registration portion stores the identification information and the password information in the storage portion.

7. The information processing device according to claim 6, wherein the storage portion further stores password registration permission information that indicates whether storage of the password information is permitted, wherein:

when the password registration permission information does not indicate that storage is authorized, and the information processing device is unable to communicate with the certification device, the certification portion performs user certification based on whether or not the identification information is stored in the storage portion;

when the user has permission, and the password registration permission information indicates that storage is permitted, the registration portion stores the identification information and the password information in the storage portion, and when the user has permission, and the password registration permission information does not indicate that registration is permitted, the registration portion stores only the identification information.

8. An information processing method comprising:
receiving, by an information processing device, input identification information that identifies a user;
transmitting the identification information to a certification device which determines whether the user has permission to use the information processing device;
storing the identification information in a storage portion, in response to the certification device determining that the user has permission to use the information processing device;
determining, by a certification portion of the information processing device, whether the information processing device is unable to communicate with the certification device;
determining whether the user has permission to use the information processing device based on the identification information stored in the storage portion, in response to determining the information processing device is unable to communicate with the certification device;
detecting a cause of non-communication when the certification device cannot be communicated with; and
prohibiting the certification portion from determining whether the user has permission to use the information processing device based on whether the identification information is stored in the storage portion, when the cause of the non-communication is a predetermined cause.

9. An information processing method comprising:
receiving, by an information processing device, input identification information that identifies a user;
transmitting the identification information to a certification device which determines whether the user has usage permission to use the information processing device;
storing the identification information in a storage portion, in response to the certification device determining that the user has permission to use the information processing device;
determining, by a certification portion of the information processing device, whether the information processing device is unable to communicate with the certification device and determining whether the user has permission to use the information processing device based on the identification information stored in the storage portion, in response to determining the information processing device is unable to communicate with the certification device;
receiving input certification designation information which designates whether the user has certification of permission based on whether the identification information is stored in the storage portion;
storing the certification designation information received by the reception portion in the storage portion, and
wherein when the certification designation information stored in the storage portion indicates that the user has certification of permission and the information processing device is unable to communicate with the certification device, determining whether the user has permission to use the information processing device based on whether the identification information is stored in the storage portion and setting a length of a monitoring time for monitoring a communication status of the certification device, to determine whether the information processing device is unable to communicate with the certification device, to be shorter than a monitoring time for a case in which the user does not have certification of permission.

* * * * *